US010913057B2

(12) United States Patent
Coupland et al.

(10) Patent No.: US 10,913,057 B2
(45) Date of Patent: Feb. 9, 2021

(54) SHAPED CATALYST PARTICLE

(71) Applicant: JOHNSON MATTHEY PUBLIC LIMITED COMPANY, London (GB)

(72) Inventors: Duncan Coupland, Hertfordshire (GB); Sophie Winfield, Hertfordshire (GB)

(73) Assignee: Johnson Matthey Public Limited Company, London (GB)

( * ) Notice: Subject to any disclaimer, the term of this patent is extended or adjusted under 35 U.S.C. 154(b) by 84 days.

(21) Appl. No.: 15/565,780

(22) PCT Filed: Apr. 12, 2016

(86) PCT No.: PCT/GB2016/051027
§ 371 (c)(1),
(2) Date: Oct. 11, 2017

(87) PCT Pub. No.: WO2016/166526
PCT Pub. Date: Oct. 20, 2016

(65) Prior Publication Data
US 2018/0117578 A1 May 3, 2018

(30) Foreign Application Priority Data

Apr. 14, 2015 (GB) .................................. 1506325.8

(51) Int. Cl.
*B01J 35/02* (2006.01)
*B01D 15/10* (2006.01)
*B01D 53/04* (2006.01)
*B01J 8/02* (2006.01)
*B01J 37/00* (2006.01)
(Continued)

(52) U.S. Cl.
CPC ............ *B01J 35/023* (2013.01); *B01D 15/10* (2013.01); *B01D 53/04* (2013.01); *B01J 8/02* (2013.01); *B01J 35/026* (2013.01); *B01J 37/0072* (2013.01); *B01J 37/0221* (2013.01); *B01J 37/0236* (2013.01); *C01B 3/16* (2013.01); *B01D 2257/30* (2013.01); *B01D 2257/602* (2013.01);
(Continued)

(58) Field of Classification Search
CPC ...................................................... B01J 35/023
See application file for complete search history.

(56) References Cited

U.S. PATENT DOCUMENTS

| 4,368,131 A | 1/1983 | Rosenweig |
| 4,737,478 A | 4/1988 | Rainis |

(Continued)

FOREIGN PATENT DOCUMENTS

| CN | 2225297 Y | 4/1996 |
| CN | 2397996 Y | 9/2000 |

(Continued)

OTHER PUBLICATIONS

GB1506325.8, GB Search Report Under Section 17(6) dated Oct. 31, 2016.

(Continued)

*Primary Examiner* — Stuart L Hendrickson
(74) *Attorney, Agent, or Firm* — BakerHostetler

(57) ABSTRACT

The invention concerns particles which may include a catalytically active component, in the form of a three-dimensional ellipsoidal shape having three major axes at least two of which axes are of different lengths. Beds of such particles are useful for forming particle beds through which a fluid may flow.

27 Claims, 13 Drawing Sheets

(51) Int. Cl.
*B01J 37/02* (2006.01)
*C01B 3/16* (2006.01)

(52) U.S. Cl.
CPC . *B01J 2208/024* (2013.01); *C01B 2203/0283* (2013.01); *C01B 2203/1082* (2013.01)

(56) References Cited

U.S. PATENT DOCUMENTS

| | | | | |
|---|---|---|---|---|
| 4,818,744 A | * | 4/1989 | Berger | B01D 53/8609 |
| | | | | 502/244 |
| 4,840,932 A | * | 6/1989 | Matsuura | B01J 23/22 |
| | | | | 502/202 |
| 6,221,492 B1 | | 4/2001 | Moreau et al. | |
| 6,294,633 B1 | * | 9/2001 | Hidaka | B01J 29/18 |
| | | | | 502/232 |
| 7,384,612 B2 | * | 6/2008 | Ajisaka | F01N 3/022 |
| | | | | 422/177 |
| 2004/0220436 A1 | | 11/2004 | Birke et al. | |
| 2007/0037697 A1 | | 2/2007 | DiMascio | |
| 2009/0099007 A1 | | 4/2009 | Khare | |
| 2011/0054129 A1 | | 3/2011 | Gupta et al. | |
| 2012/0022224 A1 | | 1/2012 | Tosin et al. | |
| 2014/0256535 A1 | | 9/2014 | Fang et al. | |
| 2014/0274679 A1 | | 9/2014 | Erfan | |
| 2014/0357471 A1 | | 12/2014 | Lacombe et al. | |

FOREIGN PATENT DOCUMENTS

| | | |
|---|---|---|
| CN | 201543427 U | 8/2010 |
| CN | 202376996 U | 8/2012 |
| CN | 202410684 U | 9/2012 |
| CN | 202478944 U | 10/2012 |
| CN | 203303962 U | 11/2013 |
| JP | S63065942 | 4/1988 |
| JP | H06170232 | 6/1994 |
| JP | H06170237 | 6/1994 |
| JP | 2007061779 A | 3/2007 |
| RU | 2317853 C2 | 2/2008 |
| WO | WO2005002764 A1 | 1/2005 |
| WO | WO2012032325 A1 | 3/2012 |

OTHER PUBLICATIONS

PCT/GB2016/051027, International Search Report, dated Jun. 30, 2016.
PCT/GB2016/051027, Written Opinion, dated Jun. 30, 2016.

* cited by examiner

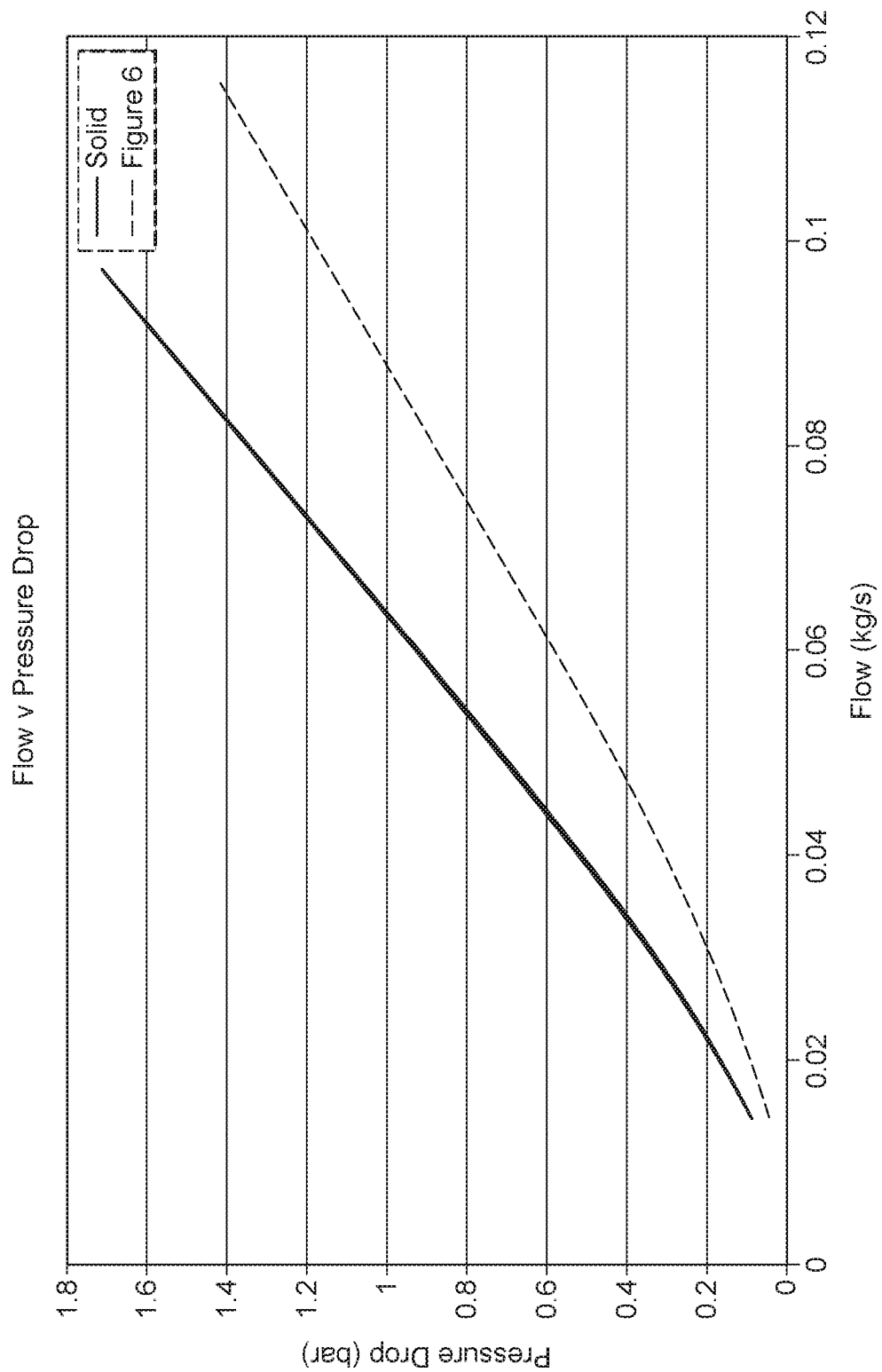

SHAPED CATALYST PARTICLE

CROSS-REFERENCE TO RELATED APPLICATIONS

This application is the National Stage of International Patent Application No. PCT/GB2016/051027, filed Apr. 12, 2016, which claims priority from Great Britain Patent Application No. 1506325.8 filed Apr. 14, 2015, the disclosures of each of which are incorporated herein by reference in their entirety.

The invention concerns catalyst particles, reactors containing a bed of such catalyst particles and chemical reactions catalysed by such catalyst particles.

Traditional catalyst pellets and catalyst supports may, by the nature of their manufacture, exhibit two dimensional complexity of design and structure but almost invariably require these geometries to be extended into the third dimension by extrusion or tabletting methods. This third dimension has little potential for geometric complexity as a result. The performance of a catalyst is partly determined by the ability of the catalyst scientist to promote and control the interaction of the gas or liquid stream of reactants with the catalyst itself. This ability is compromised by their limited control over the pellet geometry.

New particle designs, which are made possible using additive layer manufacturing methods, including 3D printing techniques), can provide very high surface area to volume catalysts in combination with control of flow of reactants over and through the catalyst pellets. Control of flow of reactants and products through the catalyst particle improves the opportunity for controlling turbulence and boundary-layer characteristics as a consequence of the reaction distribution through the bed. This is especially effective when combined with enhanced bed-packing which allows control of the thermal distribution in a catalyst bed by modification of flows both vertically and laterally through the bed. New catalyst particle shapes allow the advantages of 3D printing methods to contribute to the improvement of the control of the flow of fluids and chemical reactions in catalyst beds.

According to the invention, we provide a catalyst particle in the form of a three-dimensional shaped particle in the general form of an ellipsoid having no more than two of its principal axes of equal length.

We further provide a catalyst bed or sorbent bed comprising a plurality of catalyst particles, each said catalyst particle having the form of a three-dimensional shaped particle in the general form of an ellipsoid having no more than two of its principal axes of equal length.

According to a further aspect of the invention, we provide a catalyst bed comprising a plurality of catalyst particles according to the invention contained within a vessel.

We further provide a method of carrying out a chemical reaction comprising the step of contacting at least one fluid containing at least one starting chemical compound with a catalyst bed according to the invention.

We further provide a method of treating a fluid mixture to selectively remove one or more target components of the mixture by contacting the fluid mixture with a catalyst bed according to the invention.

An ellipsoid is a geometric three-dimensional shape having three principal axes. When all axes are equal, the ellipsoid is known as a sphere. Therefore the ellipsoidal catalyst particles of the invention do not have all three major axes being equal. When two major axes of an ellipsoid are equal, the shape is known as an oblate (or prolate) spheroid or ellipsoid of revolution. The term spheroid will be used hereinafter to refer to any ellipsoid having two, and only two, of its major axes of equal length. Therefore the catalyst particles of the present invention have the form of a tri-axial ellipsoid (i.e. all three major axes are of different lengths) or spheroid. All three of the major axes of the ellipsoidal particles may be of different lengths.

A particular advantage of the invention is that ellipsoidal particles may achieve a higher packing density than conventionally shaped spherical or cylindrical particles. When the packing density is higher, the available surface for contact with a fluid stream is larger, but at the conventional penalty of increased resistance to flow which commonly manifests as increased pressure drop through a bed. A larger available surface affects key properties of a chemical reaction taking place within a bed of such particles, which enable the reaction to be better controlled. The available surface of the catalyst particles may be selected to control reaction rates, contact times and heat transfer in the catalyst bed. The shape of the ellipsoidal particle is controlled by the relative lengths of its three principal axes. The relative lengths of the principal axes determine the packing density. The ratio of axes of a spheroid may be referred to as the aspect ratio.

The ellipsoidal catalyst particles may be solid or they may include void spaces. The term "void space" is not intended to include microscopic spaces such as pores or spaces between particles of material from which the catalyst particle is formed. A void space as used herein refers to a macroscopic space within the particle. A void space may comprise an internal cavity, a surface groove or indentation, or an intra-particle channel (hereinafter "channel"), or a combination of more than one type of void space, extending from a first location on the surface of the particle through the interior of the particle to a second location on the surface of the particle. A channel always includes an opening at the surface of the particle so that fluid may enter and leave the particle. The particle may comprise more than one channel. The particle may comprise, for example, from 1 to 24 intra-particle channels. The catalyst particle may comprise from 1 to 100 channels per $cm^2$ of the particle's cross-section.

When the particle comprises an internal cavity, the cavity is preferably in communication with an opening at the external surface of the particle. The cavity may communicate with one, or more than one, opening at the external surface of the particle. From 0 to 30, preferably from 2 to 20, openings may be present in the external surface of the particle. The catalyst particle may comprise from 0 to 100 openings per $cm^2$ of the particle's cross-section. More than one cavity may be present in the particle.

A void space within the particle may comprise one or more intra-particle channels extending from a first opening at a first location on the surface of the particle to a second opening at a second location on the surface of the particle. Fluid may enter or leave the interior of the particle though the openings. The catalyst particle may comprise from 0 to 24 channels, usually from 2 to about 12 channels. The catalyst particle may comprise from 0 to 100 openings per $cm^2$ of the particle's cross-section. The channels may be straight, angled or curved. They may provide a tortuous path through the particle. Each channel may have a cross-section which is of any shape, although generally circular, elliptical or polygonal shapes such as square/rectangular channels or triangular channels may be usual. Each channel may include ribs, flutes or vanes on its internal surface. Each channel may have a cross-section which varies along the length of the channel. The internal surface of the channel may be shaped to promote mixing of a fluid as it passes through the channel, for example by providing a threaded or helical channel. The channels may or may not have parallel walls. A channel may be wider at an end or towards the centre of the channel. Therefore a channel may include a narrow portion adjacent either of the surface openings or between the surface openings. A channel having a relatively narrow portion between two wider openings may be described as "waisted". The diameter of any one channel may be the same as or different from the diameter of any other channel within the same particle. A channel may form or join with a cavity within the particle. Channels may join to form a cavity within the particle. A channel may be aligned with a principal axis of the ellipsoid.

The openings of the channels may be the same or different from those of each other channel. The surface openings may differ in shape or in size. The surface openings of a channel may be offset from each other. The first and second openings of a single channel may be different from each other. A surface opening may have a chamfered edge.

Channel openings may be distributed around the surface of the particle in a regular or an irregular manner. For example, channel openings may be positioned at regular radial spacings around the circumference of a spheroidal particle. The number of channels and their position may be selected so that sufficient of the particle surface is preserved to retain sufficient strength in the particle to enable it to be handled and used without significant risk of breakage. For example, if more than one of the channel openings are located around the same circumference of the particle, then it may be desirable that their area preserves at least 50% of the circumference as solid material. The distance between the edges of adjacent surface openings may be, for example, at least 1 mm, or less than 1 mm, for example, 0.5 mm, such as 0.2 mm. It is possible to design a particle having the appropriate distance between openings by testing the crush strength of the particle. The target minimum crush strength to be achieved may be estimated from considering the use to which the particles will be put. For example, if the particles are to be used as a catalyst bed then the weight of the bed and the force exerted on particles at the bottom of the bed may be calculated. Clearly the particle must be capable of withstanding such a force under the conditions of temperature and pressure used in the reaction.

In a particular embodiment of the invention, the void space within the particles is selected to be in proportion to the void space between particles when they are packed in a catalyst bed. The volume of the void space within the particles may be selected to be approximately the same as the volume of void space between particles when they are packed in a catalyst bed. The average width or diameter of channels within the particles may be selected to be approximately the same as the average width or diameter of void space in the form of channels between the particles when they are packed in a catalyst bed. The average cross-sectional area of channels passing through the particles may be selected to be approximately the same as the average inter-particle void area in the form of channels between the particles when they are packed in a catalyst bed. Here "approximately the same means" equal to or within ±50%, or ±40%, or within ±20% of the void space between the particles. Inter-particle channel properties such as average inter-particle channel cross-sectional area, or total void volume may be calculated using mathematical modelling methods. Inter-particle channel properties may be estimated using physical modelling. One such method includes forming a packed volume of particles and then filling the void space with a settable material such as a resin. When set, the packed volume may be examined visually or using computational methods to determine the average void space cross-section. The packed volume may alternatively be examined using non-invasive imaging methods, such as X-ray imaging or radiation tomography.

When properties of the intra-particle void space are selected to approximate the average inter-particle void space, the fluid flow through a bed of such particles may be optimised. The balance between the inter-particle and intra-particle channel cross-sectional area affects the back-pressure or resistance to flow within a bed of particles. When the average, minimum cross sectional area of the channels through the particles is matched with the average cross sectional area of the passageways making up the void space between particles+/−50, the pressure drop through and around the particles may be balanced. It is usually beneficial for a catalyst or sorbent bed to provide a minimal pressure drop, or resistance, when fluid is passed through the bed. A greater void space (or "voidage") in the bed provides more space for fluid to flow and so induces less pressure drop than a bed having less voidage. A high pressure drop through a particle bed (or any piece of process apparatus) requires that high fluid pressure is used in order to achieve a desired flow rate. The use of high pressures entails compression and pumping costs and increases the wear on process equipment compared with a similar process step involving a lower pressure drop. Forcing a fluid through a particle bed at high pressure may also damage the particles. If particles fracture into smaller particles under such pressure then the compaction of the bed increases, thereby further increasing the pressure drop through the bed. In some processes it is desirable to increase the pressure drop through a catalyst bed. For example, when a particle bed is relatively thin in to the direction of fluid flow, a high pressure drop may be used to increase the contact time between the fluid and the catalyst or otherwise to control the fluid flow rate.

The present invention does not include solid spherical catalyst particles. We further provide, according to the invention, a catalyst particle having the general shape of a sphere and comprising at least one intra-particle channel extending from a first location on the surface of the particle through the interior of the particle to a second location on the surface of the particle. Such spherical particles preferably comprise at least two void spaces or channels. Each void space may comprise a channel or a cavity as previously described herein. Spherical particles are not ellipsoidal as defined herein.

The surface of the particle may include grooves, blind channels or indentations. The surface of the particle may include protrusions such as bosses, ridges and lobes, for example. Such surface topography may be used to control the packing density and the average cross-sectional area of the inter-particle channels.

The catalyst particle may itself be catalytically active or it may be a catalyst support which is suitable for supporting a catalytically active material. The catalyst particle may comprise a catalytically active composition. By catalytically active composition we mean a composition which has catalytic properties for at least one chemical reaction. The catalyst particle may be formed entirely of one or more than one catalytically active composition. Alternatively the catalyst particle may be formed partially of at least one catalytically active composition, for example a catalytically active composition may be present at one or more surfaces of the catalyst particle. The catalytically active material may be present over the whole or only portions of the surfaces of the particle. Different catalytically active materials may be present at different surfaces of the particle. For example a catalytically active material may be present at the surfaces of one or more intra-particle channels whilst either no catalytically active material is present at other surfaces of the particle or a different catalytically active material may be present at other surfaces of the particle. A catalytically active material may be present beneath a surface of the particle i.e. the catalytically active material is distributed in the form of an egg-shell. The catalytically active material maybe present throughout or substantially throughout the catalyst particle. It is known in the design of catalysts to design catalyst particles having a catalytic material located at a particular depth beneath the surface of the particle in order to avoid loss of activity through abrasion of the catalyst surface during use.

Regardless of how the catalytically active material is present, different catalytic materials (e.g. 2, 3, 4 or 5) may be present. Moreover, one or more catalytically active materials, which may be the same or different, may be present over the whole or portions of the surfaces of the particle and one or more catalytically active materials, which may be the same or different, may be present beneath the surface of the particle and/or throughout or substantially throughout the catalyst particle.

A particle bed (catalyst bed) may be formed from different particles of the invention. Alternatively all of the particles forming a catalyst bed may be essentially identical (differing only within manufacturing tolerances). The size, shape and internal void space may vary between particles in the same catalyst bed. The nature or concentration of a catalytically active material may vary between particles in the same catalyst bed. Different catalyst particles may be mixed together to form an essentially homogeneous mixture of particles forming the bed. Alternatively a catalyst bed may be formed of distinct volumes within which the catalyst particles are similar but differ from the catalyst particles within a different volume of the bed. For example, a catalyst bed may be formed of layers comprising catalyst particles of the present invention in which the characteristics of size, shape, internal voidage, and/or catalytically active material differ between layers. The boundary between any two layers may be sharp or graduated. The boundary may be facilitated by a physical structure such as a support, e.g. in the form of a screen. Use of catalyst particles having a smaller voidage (intra-particle and/or inter-particle) may provide a method of controlling flow within the bed so that reaction rate may be controlled across the bed. Control of reaction rate in this way may be used to control the temperature profile within a catalyst bed.

When the catalyst particle is a catalyst support which is suitable for supporting a catalytically active material, it may be loaded with catalytically active material by methods known in the catalyst manufacturing industry, including metal vapour deposition, coating, impregnation, infiltration, precipitation of a catalytically active composition, wash coating, pan coating and slurry dipping (dip coating). Suitable compounds for impregnation, precipitation and pan coating include soluble metal compounds such as metal nitrates, halides, carboxylates, sulphates etc. Suitable compounds for slurry dipping include insoluble metal compounds such as metals or metal oxides.

The catalyst particle in the form of a catalyst support may be formed from a variety of materials which are known for use as catalyst supports. Typical materials include metal oxides and ceramics such as alumina, silica, zirconia, titania, magnesia, silicon nitride, silicon carbide, carbon and mixtures thereof. A conventional ceramic catalyst support may also be used. The catalyst support powder may also comprise one or more transition metal compounds, including lanthanide metal compounds and actinide metal compounds, selected from metal oxides, metal hydroxides, metal carbonates, metal hydroxycarbonates or mixture thereof. The transition metal compound may comprise a single or mixed metal oxide or a composition comprising two or more transition metal oxides. Preferably, the catalyst support powder comprises an alumina, metal-aluminate, silica, alumino-silicate, titania, zirconia, magnesia, zinc oxide, or a mixture thereof.

Although the term "catalyst particle" has been used throughout this specification, we include catalytically inert particles in the term "catalyst particle". Therefore catalyst particles according to the invention may not be used to catalyse a chemical reaction. As is known in the chemical industry, catalytically inert particles may be used to manage fluid flow, heat transfer, catalytic activity etc by providing layers of such inert particles within a catalyst bed, mixing inert particles with catalytically active particles within a catalyst bed or by providing separate beds of inert particles. Catalyst particles according to the invention may be catalytically inert, i.e. they may not include a catalytically active component.

The catalytically active composition, when present, may comprise at least one metal or metal compound selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, or Ce. The metal of metal compound may preferably comprise a precious metal, e.g. comprising one or more of Pt, Pd, Ir, Ru, Re, optionally mixed with one or more transition metals. The metal or metal compound may preferably comprise one or more transition metal compounds, including lanthanide metal compounds and actinide metal compounds. The transition metal compounds may be a metal oxide, metal hydroxide, metal carbonate, metal hydroxycarbonate or mixture thereof. Transition metal oxides may comprise a single or mixed metal oxide such as a spinel or perovskite, or a composition comprising two or more transition metal oxides.

The catalytically active composition may further comprise one or more powdered inert materials such as alumina, silica, silicon nitride, silicon carbide, carbon and mixtures thereof. Ceramics such as cordierite may also be present. The catalytically active composition may comprise a zeolite.

Where the catalyst particle comprises one or more reducible metal compounds, it may be subjected to a reduction step to convert the metal compounds to the corresponding metals. This may be performed directly on the catalyst particle without a prior heating step, or may be performed after a heating step, to convert reducible metal oxides to the corresponding metals. The reduction may be achieved by exposing the catalyst particle to a hydrogen-containing gas stream at a temperature in the range 150 to 800°, preferably 150 to 600° C.

Catalysts comprising reduced metals may be pyrophoric and so it is desirable that the reduced metal in the catalyst particle is passivated by controlled exposure of the catalyst particle to an oxygen-containing gas stream to form a passivating layer on the reduced metal.

The catalyst particle according to the invention may have various dimensions. The length of the principal axes of the catalyst particle may be within the range from 0.5 mm to 100 mm. Typical particles may have a longest dimension in the range from 3-30 mm including from 3-15 mm. Typical particles may have shorter principal axes in the range from 0.5 mm to 100 mm, more usually 3-30 mm, for example from 3-15 mm. The size of the particles affects the inter-particle void space when the particles are packed in a packed bed arrangement. Therefore the balance between inter-particle and intra-particle void space may be selected and changed by changing the size of the particles.

The catalyst may be formed by any known manufacturing method. The complexity of the shape of catalyst particle according to the invention makes manufacture by additive layer manufacturing (ALM) methods (also known as 3D printing) particularly advantageous. An example of a catalyst particle with a complex shape is depicted in FIG. 12. Suitable methods of additive layer manufacturing are discussed in WO2012/032325. A suitable method comprises the steps of (a) forming a layer of a powdered catalyst or catalyst support material, (b) binding or fusing the powder in said layer according to a predetermined pattern, and (c) repeating (a) and (b) layer upon layer to form a catalyst particle. ALM processes are enabled by conventional 3D design computer packages that allow design of the catalyst particle as a so-called, "STL file", which is a simple mesh depiction of the 3D shape. The STL file is dissected using the design software into multiple two-dimensional layers, which are the basis for the fabrication process. The fabrication equipment, reading the two-dimensional pattern, then sequentially deposits layer upon layer of powder material corresponding to the 2D slices. In order that the catalyst particle has structural integrity, the powder material is bound or fused together as the layers are deposited. The process of layer deposition and binding or fusion is repeated until a robust catalyst particle is generated. The un-bound or un-fused powder is readily separated from the catalyst particle, e.g. by gravity, or blowing.

A number of ALM binding and fusion fabrication techniques are available, notably 3D printing and laser sintering techniques. Any of the techniques may however be used.

In laser sintering, the process comprises three steps in which a thin layer of powder material is initially applied to a base plate using a blade, roller or moving hopper. The thickness of the layer is controlled. Laser radiation is applied in two dimensions to fuse the layer. The laser position is controlled, e.g. using galvanometer mirrors, according to the desired pattern. After the layer is fused, the plate on which the layer rests is moved downwards by the thickness of one layer and a fresh layer of powders screened over the fused later. The procedure is repeated thus producing the catalyst particle in three dimensions. After the shape is formed, the un-fused powder is separated from the catalyst particle simply by gravity or by blowing it away.

Direct laser sintering performs the process at elevated temperature using a solid state fibre laser. Such a system is commercially available from Phenix Systems, for example as described in WO 2005002764.

An alternative approach is to use a powder material with a polymeric coating or a composition comprising a powder material and a polymeric binder. In this case, the laser acts to melt the binder. This technique has the advantage that the laser power may be considerably lower than the fusion method laser. Polymeric coating technology is available commercially from EOS GmbH.

A further alternative, known as stereolithography, uses the powder as a dispersion in a monomer, which acts as a binder when it is "cured" in layers by photopolymerisation using a UV laser. The power material may be up to about 60% by volume in the monomer. Suitable equipment for performing this process is available commercially from the Cerampilot.

In these methods, but particularly the latter, the catalyst particle may be subjected to a subsequent heat treatment, which may be carried out to burn out and remove any polymeric binder and/or alter the physiochemical properties of the catalyst particle, such as its strength.

As an alternative to laser sintering or stereolithography, the ALM method may be based on printing of a binder onto the powdered material with or without subsequent heating. Generally this method uses a multiple array ink-jet printing head to spray a layer of a liquid binder on the powder layer to hold the particles together. The support plate moves down in the same manner as previously and again the procedure is repeated building up the catalyst particle as before. The layers in this case may be in the range 0.02 to 5.0 mm thick. Subsequent heat treatment is commonly applied to remove the binder. Suitable equipment for performing this process is available commercially from the Z-Corporation in the USA, which has been acquired by 3D Systems.

The additive layer manufacturing method preferably comprises a 3D printing or a laser sintering technique. Thus in one embodiment, the powder in each layer is fused by a laser. In another embodiment, the powder in each layer is bound together with a binder, which may be an inorganic binder such as a calcium aluminate cement or an organic binder, such as a phenolic polymer cellulose, gum or polysaccharide binder. A burnout additive may be included in the catalyst powder or binder to control the porosity of the resulting catalyst particle.

Howsoever the catalyst particle is formed it may be desirable to subject it to a subsequent heating step, which may be performed to burn out organic materials such as binders or pore-modifying materials, and/or modify the physiochemical properties, e.g. convert non-oxidic metal compounds into the corresponding metal oxides and/or fuse the powdered material. The heating step may be performed at a maximum temperature in the range 300 to 1700° C., preferably 500 to 1200° C.

The catalyst particles, which may comprise a catalytically active material, may be used in the form of a bed of particles within a reactor. The ability to produce geometric shapes that may not be possible with tradition production methods allows better control over bed packing and/or the resultant pressure drop. This ability to control pressure drop can contribute to reactor efficiency.

3D printing allows the design of internal fluid flow paths which control thermal flow. As many catalytic processes are limited by temperature effects, the ability to control convective thermal transfer within the system may allow increased conversion efficiency and/or selectivity. Reactor design may also be constrained by thermal considerations i.e. getting heat in or out of the system effectively. Thus, 3D printing may offer more freedom in reactor design by controlling thermal flow.

The catalyst particles according to the invention may also offer an increased active surface area to volume ratio allowing reactions to be more efficient in a smaller catalyst bed. This may allow smaller catalyst beds to be designed, while may maintain the performance of traditional beds, thus reducing capital costs.

According to the invention, we therefore further provide a chemical reaction vessel containing a catalyst bed comprising a plurality of catalyst particles according to the invention. The reaction vessel has at least one opening for allowing chemical compounds to pass into and out of the vessel. The reaction vessel may be an axial flow or a radial flow reactor.

The catalyst particles within a catalyst bed may be in an aligned form. In this instance, the catalyst bed may have a long-range order where the catalyst particles pack together over the whole or substantially the whole of the catalyst bed i.e. the geometric arrangement of the catalyst particles pack together such that repeating units of the catalyst particles are formed. The repeating units can be, for example, a packed plane or lattice of catalyst particles where the repeating unit in one part of the reactor is the same or substantially the same as the repeating unit in another part. The catalyst particles may self-assemble into an aligned catalyst bed on being deposited into the reactor. Re-assembly may be facilitated by incorporation of fracture planes or points for the purpose of controlled breakage during installation or service.

The catalyst particles within a catalyst bed may be in an unaligned form. The catalyst particles therefore may be randomly arranged or may have a short-range order. In the latter instance, while there may be areas within the catalyst bed where the catalyst particles pack together in an ordered fashion, there is no or substantially no order over the whole or substantially the whole of the catalyst bed.

The catalyst particles within a catalyst bed may have an ordered orientation as they pack in an aligned or unaligned form in the bed. For example, ellipsoids, spheroids and spheres may pack together randomly but have a better than random probability of a certain orientation. The present invention envisages the advantage of the orientation of the particles by placing internal channels such that a greater proportion of the bed may follow a long-range ordered orientation.

A method of carrying out a chemical reaction, according to the invention, comprises the step of contacting one or more starting chemical compounds with a catalyst bed comprising a plurality of catalyst particles according to the invention to form at least one product chemical compound. The contacting step normally takes place within a reaction vessel. The chemical reaction may include a sorption process for the removal of materials such as sulphur compounds or heavy metals, for example, from process streams for purification.

The chemical reaction may comprise any of a large number of known chemical transformations, including hydrogenation, dehydrogenation, oxidation, hydrodesulphurisation, steam reforming including pre-reforming, catalytic steam reforming, autothermal reforming and secondary reforming and reforming processes used for the direct reduction of iron, catalytic partial oxidation, a water-gas shift including isothermal-shift, sour shift, low-temperature shift, intermediate temperature shift, medium temperature shift and high temperature shift reactions, a methanation, a hydrocarbon synthesis by the Fischer-Tropsch reaction, methanol synthesis, ammonia synthesis, ammonia oxidation and nitrous oxide decomposition reactions, or selective oxidation or reduction reactions of internal combustion engine or power station exhaust gases.

The sorption process may comprise a method of treating a fluid mixture to selectively remove one or more target components of said mixture comprising contacting said fluid with a packed bed comprising a plurality of catalyst particles according to the invention such that at least a portion of said target components are transferred from said fluid mixture to said catalyst particles. The target components comprise sulphur, a compound of sulphur, a metal, a metal compound or a carbonaceous particulate material, for example. The sorption process may be a sorption selected from the recovery of sulphur compounds or heavy metals such as mercury and arsenic from contaminated gaseous or liquid fluid streams, or particulate matter such as carbonaceous particles, e.g. soot, from the exhaust gases of internal combustion engines and power stations. Although the term "catalyst particle" has been used throughout this specification, we include sorbent particles in the term "catalyst particle". Therefore catalyst particles according to the invention may not be used to catalyse a chemical reaction. Catalyst particles according to the invention may not include a catalytically active component.

The invention will be further described, by way of example only, with reference to the accompanying drawings, which are:

FIGS. 1-9: wireframe model drawings of catalyst particles according to the invention. Each A view is a perspective sketch of the particle. Each B view is an elevation perpendicular to the shortest axis, and each C view is a plan view, perpendicular to the longest axis.

FIGS. 1-6 all illustrate examples of spheroidal particles, i.e. ellipsoids having two axes (or diameters) "x" and "y"—of the same length and the third, major, axis "z" which is shorter than the other two axes. FIG. 1 shows a particle which has three channels 12 extending through the particle, each being angled, or "dog-legged". The six channel openings 14 are chamfered. FIGS. 2 and 3 show particles with twelve and eighteen channels respectively, each channel extending from the surface of the particle to join with a central cavity 16 within the particle. The particle of FIG. 4 includes a first ring of eight dog-legged channels 12 extending through the particle and a second ring of four smaller channels 18 inside the first ring of channels, the smaller channels having a different dog-legged shape. FIGS. 5 and 6 show particles having seven and nine channels respectively. The centrally positioned channel 20 in the particle of FIG. 6 is larger than the other channels and has a bore which is narrower towards the centre of its length than at each end, i.e. the central channel is "waisted".

FIGS. 7-9 show ellipsoidal particles in which all three major axes are of different lengths. The particle of FIG. 7 has a single channel, whereas the particle of FIG. 8 has seven channels. The particle shown in FIG. 9 is a solid particle having no channels or openings.

The geometric properties of the particles are shown in Table 1. In Table 1 the "shell thickness" is shown where the particle includes a cavity. Shell thickness represents the average distance between the cavity wall and the outer surface of the particle in a region where there is no channel present. The geometric volume is the volume of the particle, if it was solid without channels. The material volume is the volume of material forming the particle, i.e. excluding channels or cavities. The pellets/$m^3$ and SA/$m^3$ shows the number of pellets and the surface area of pellets packed into one cubic metre of space. The relative channel size represents a numerical comparison of the predicted inter-particulate spacing for the catalyst particles of the demonstration geometries, within the fixed catalyst bed compared with a prior art catalyst particle in the form of a cylinder of length 3 mm and diameter 3.2 mm.

FIG. 13 is the test data from Example 3.

EXAMPLES

Example 1

Figure 1A:
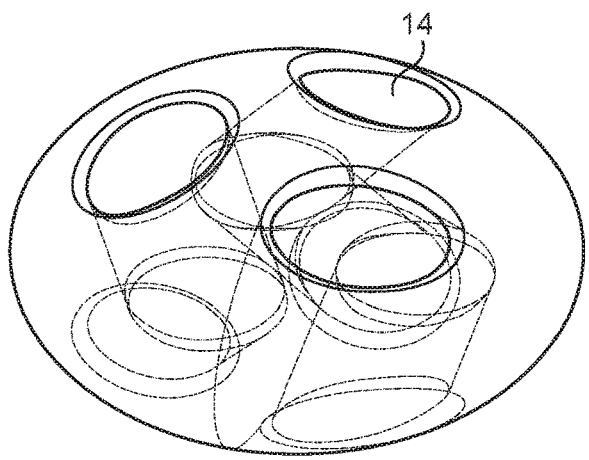
Figure 1B:
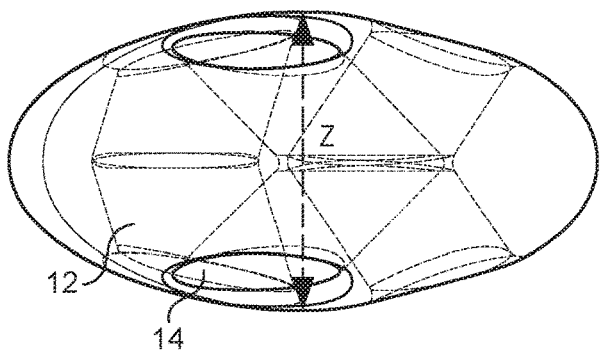
Figure 1C:
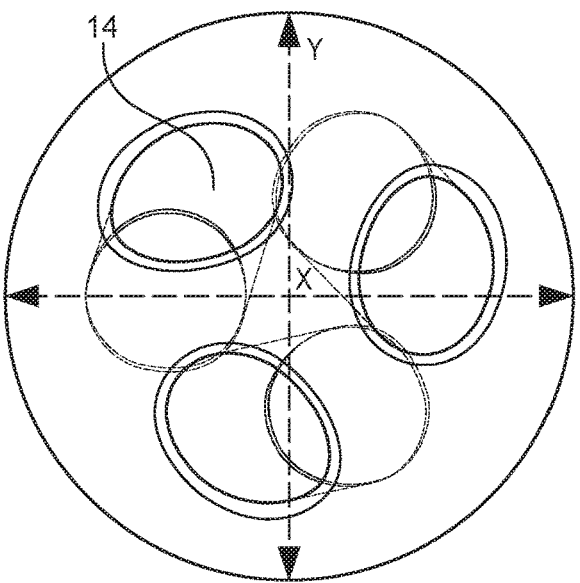
Figure 2A:
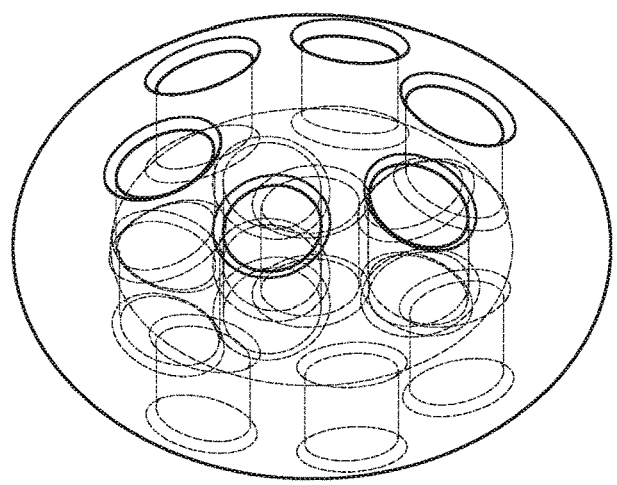
Figure 2B:
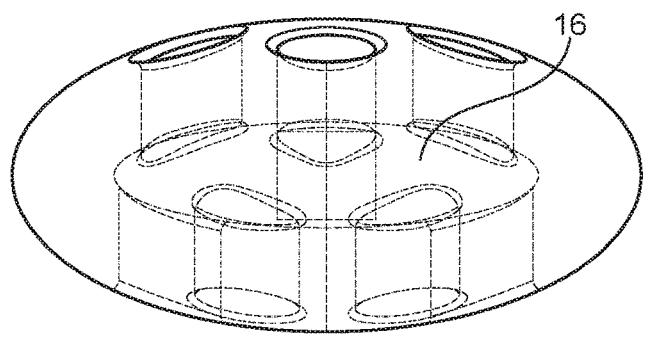
Figure 2C:
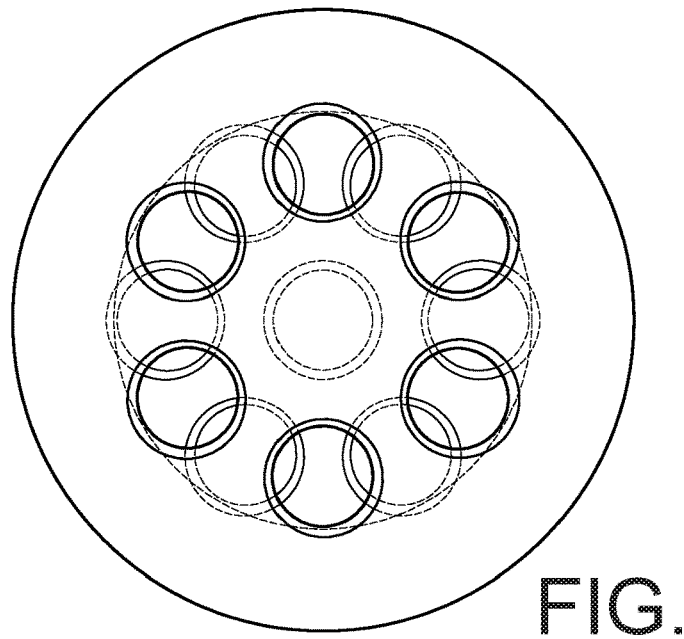
Figure 3A:
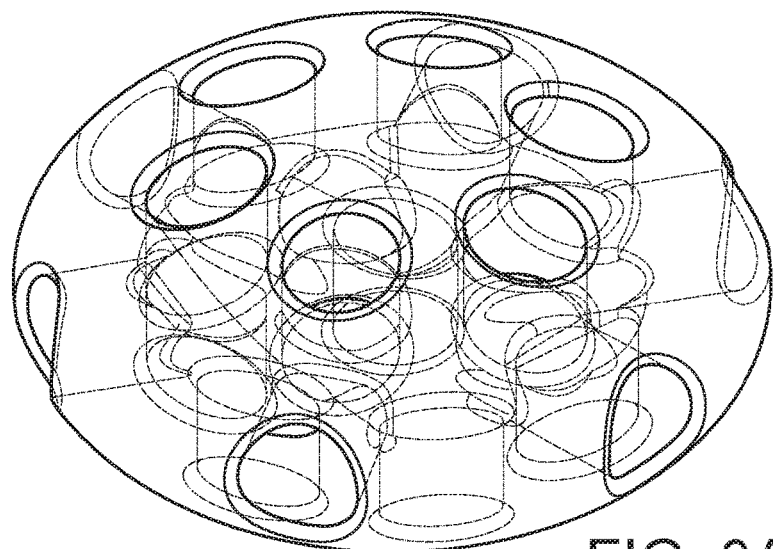
Figure 3B:
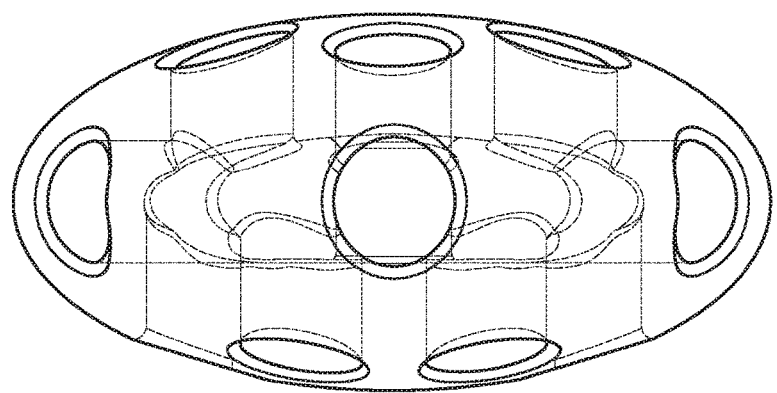
Figure 3C:
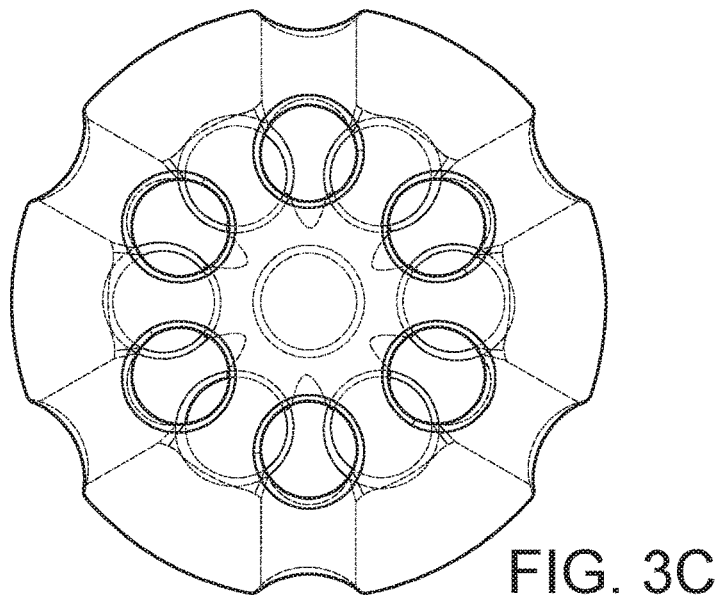
Figure 4A:
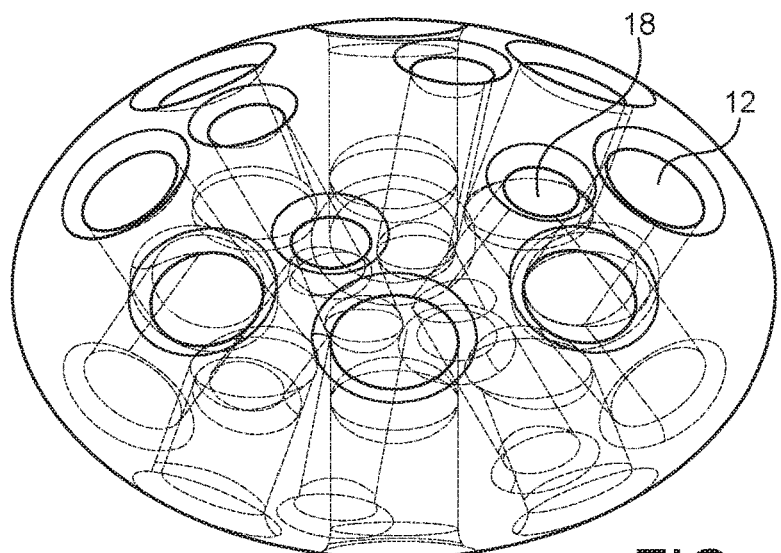
Figure 4B:
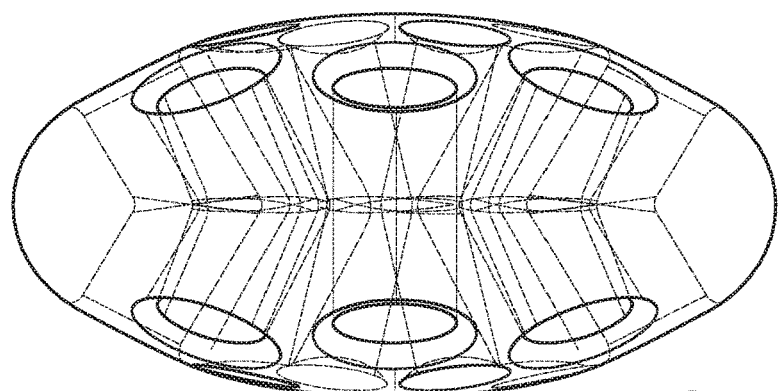
Figure 4C:
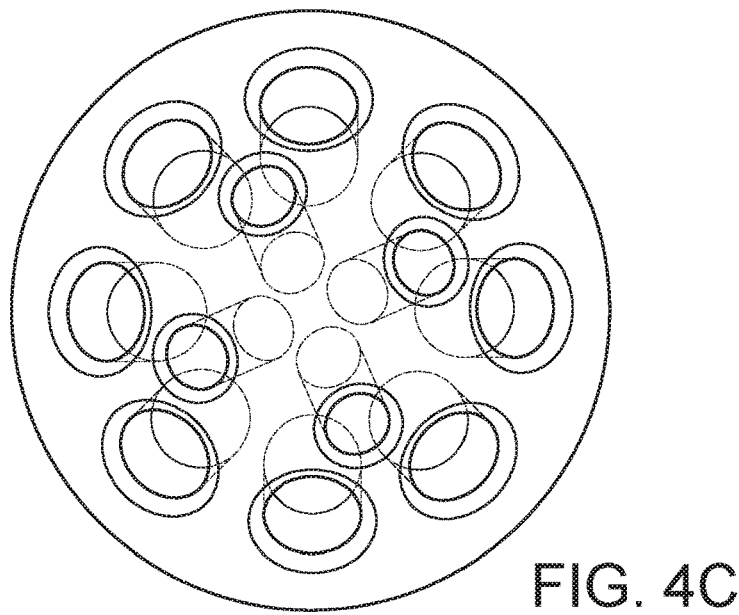
Figure 5A:
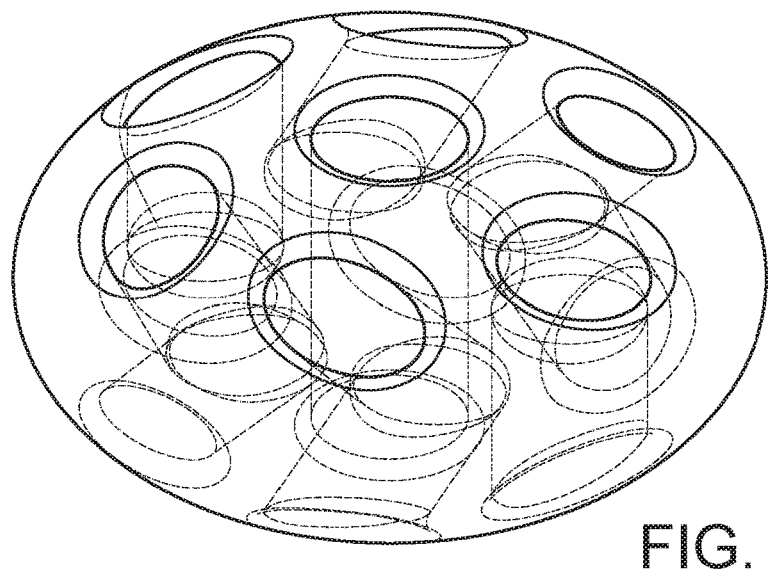
Figure 5B:
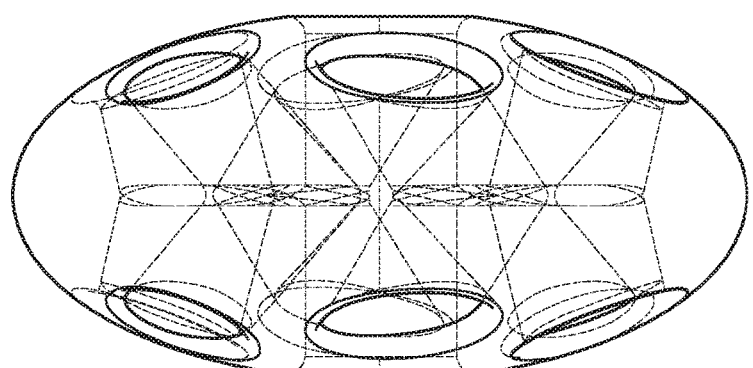
Figure 5C:
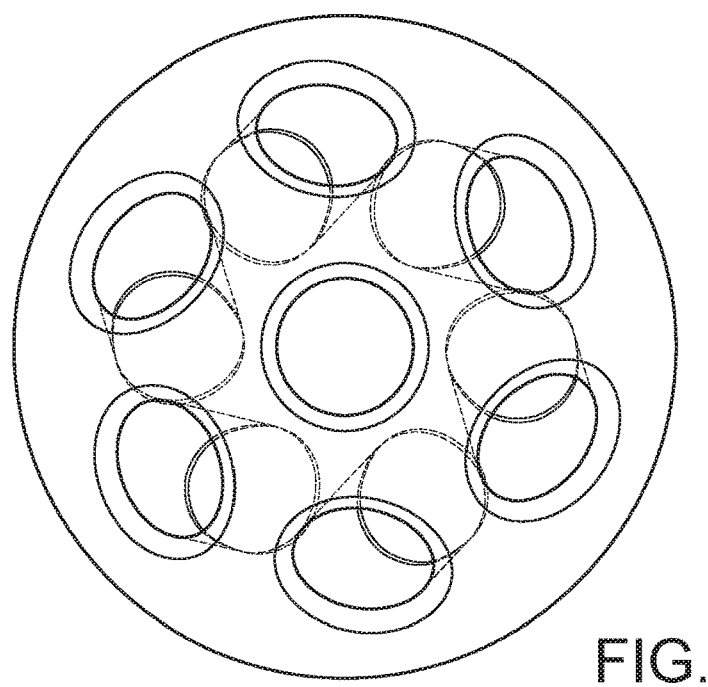

A catalyst comprising particles having the shape and dimensions shown in FIG. 1 and Table 1 was formed from a catalyst support material (alumina) and manufactured using an additive layer manufacturing method using a 3D printer. The particles were then coated with a slurry of a particulate commercial base metal catalyst composition. The coating method used was by adding the formed catalyst particles to a beaker of the slurry, mixing, filtering off the excess slurry and then drying the coated particles at 110° C. for 16-22 hours. The particles were then sieved and weighed.

A catalyst was tested to perform oxidation of ammonia. In these tests, a reactor basket of 40 mm internal diameter was charged with approximately 40 g of catalyst. A woven stainless steel gauze was clamped into the lower basket flange to support the catalyst. The catalyst bed was 54 mm deep and 40 mm in diameter. The catalysts were tested over 3 days under the following process conditions: 10 $Nm^3h^{-1}$ air, 10% vol $NH_3$, 200° C. preheat and 4 bara (0.4 MPa). The evolved gases were analysed and the conversion efficiency (for $NH_3$ to NO, expressed as a percentage) and amount of $N_2O$ by-product in the product gas stream recorded. The pressure drop was recorded once the reactor had achieved steady state operation as 14.25 mbar (1425 Pa). A similar reaction was run for comparison, using a bed of cylindrical catalyst particles 3.2 mm diameter×3 mm in length. The pressure drop was recorded as 23.75 mbar (2375 Pa).

Figure 6A:
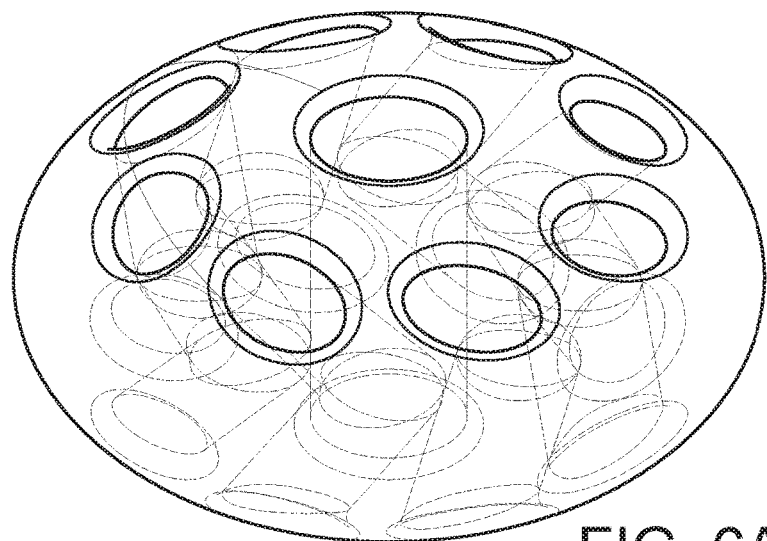
Figure 6B:
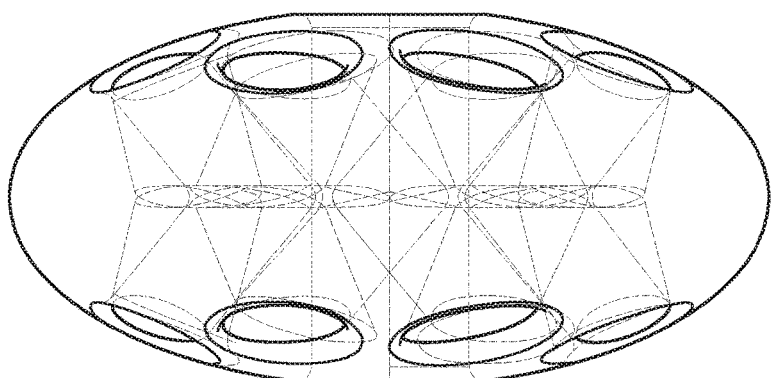
Figure 6C:
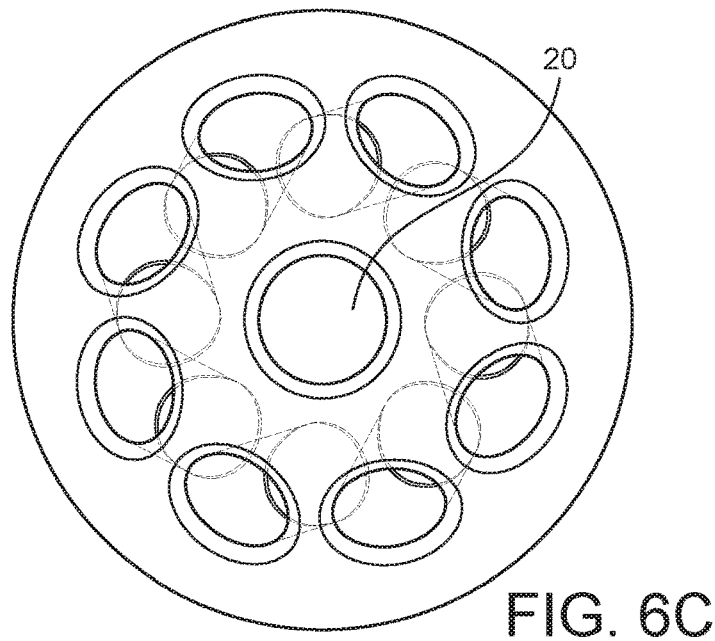
Figure 7A:
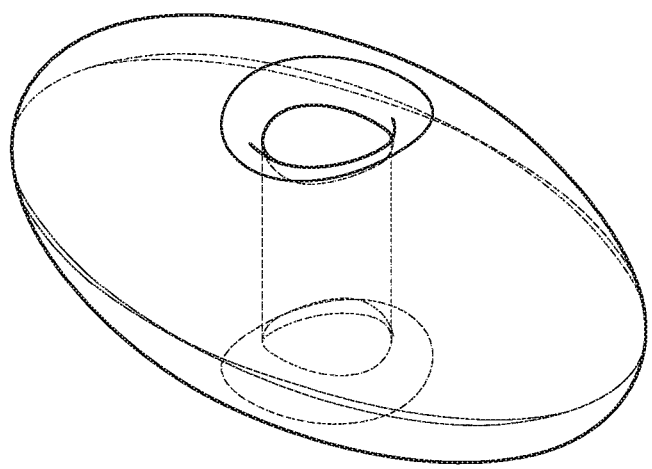
Figure 7B:
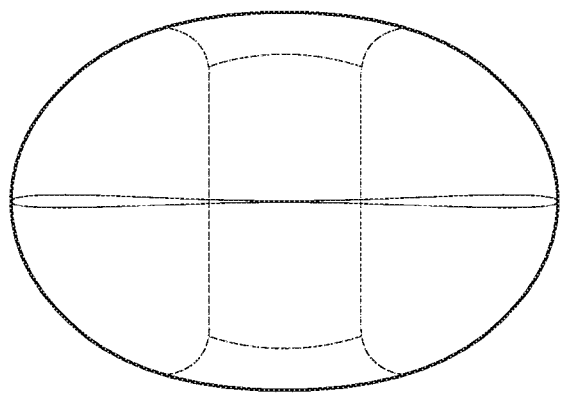
Figure 7C:
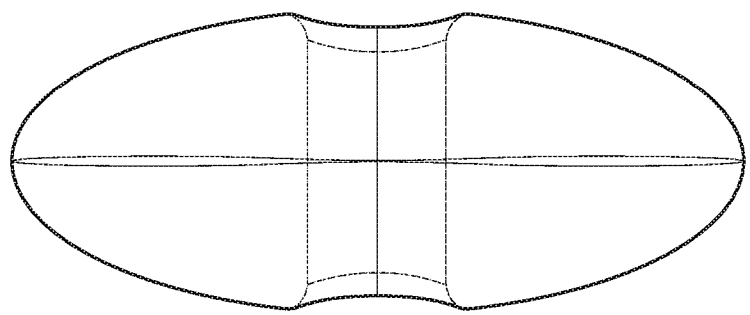
Figure 8A:
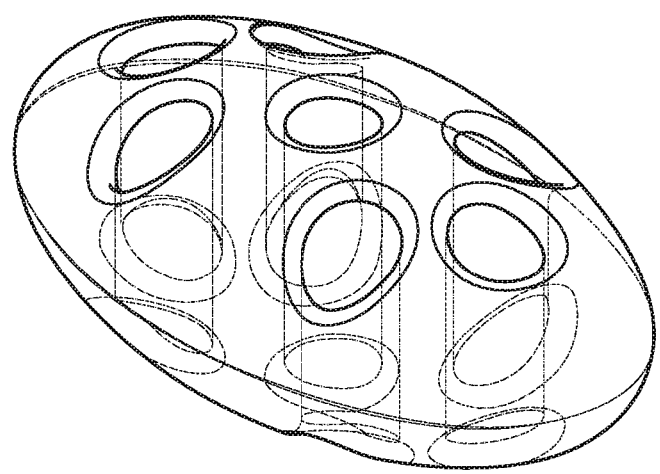
Figure 8B:
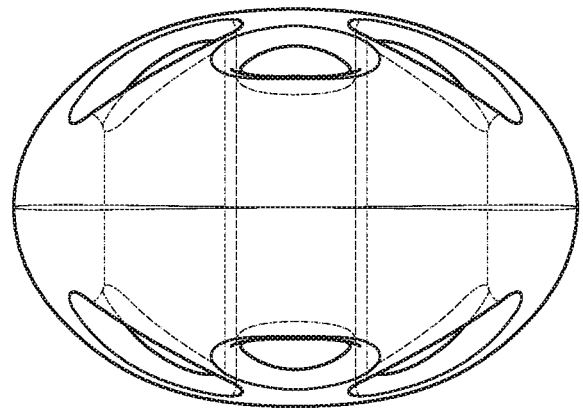
Figure 8C:
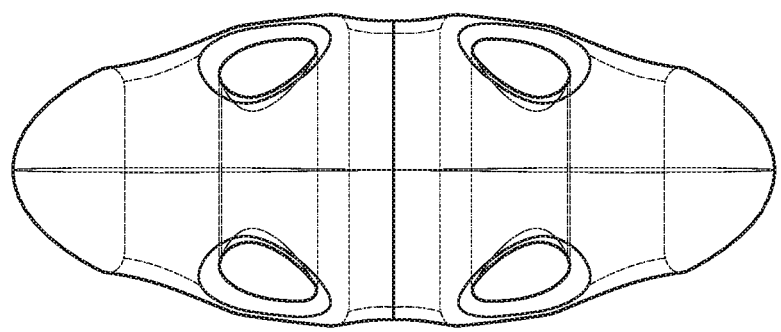
Figure 9A:
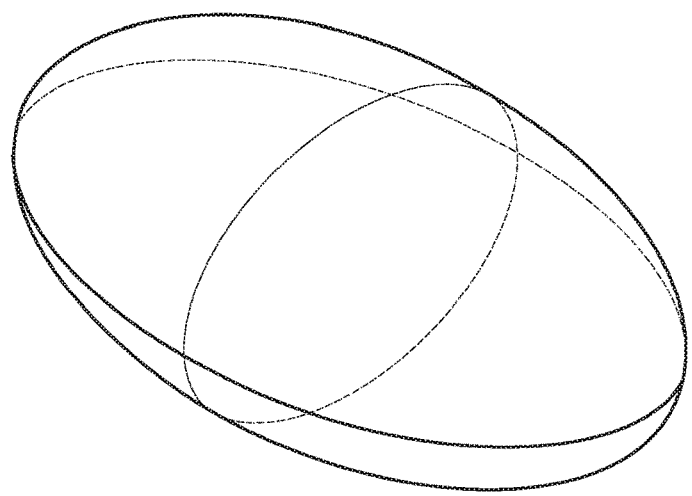
Figure 9B:
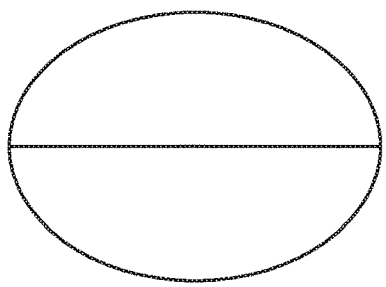
Figure 9C:
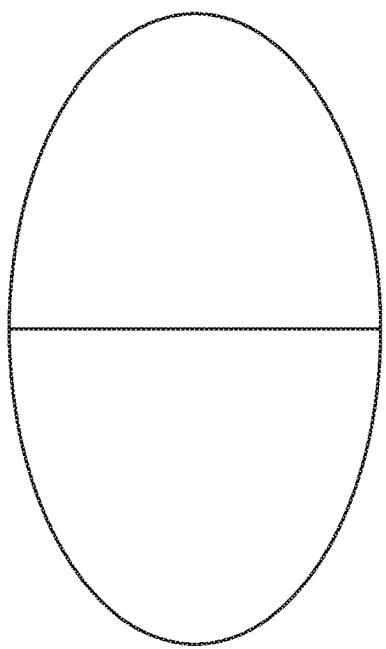
Figure 10:
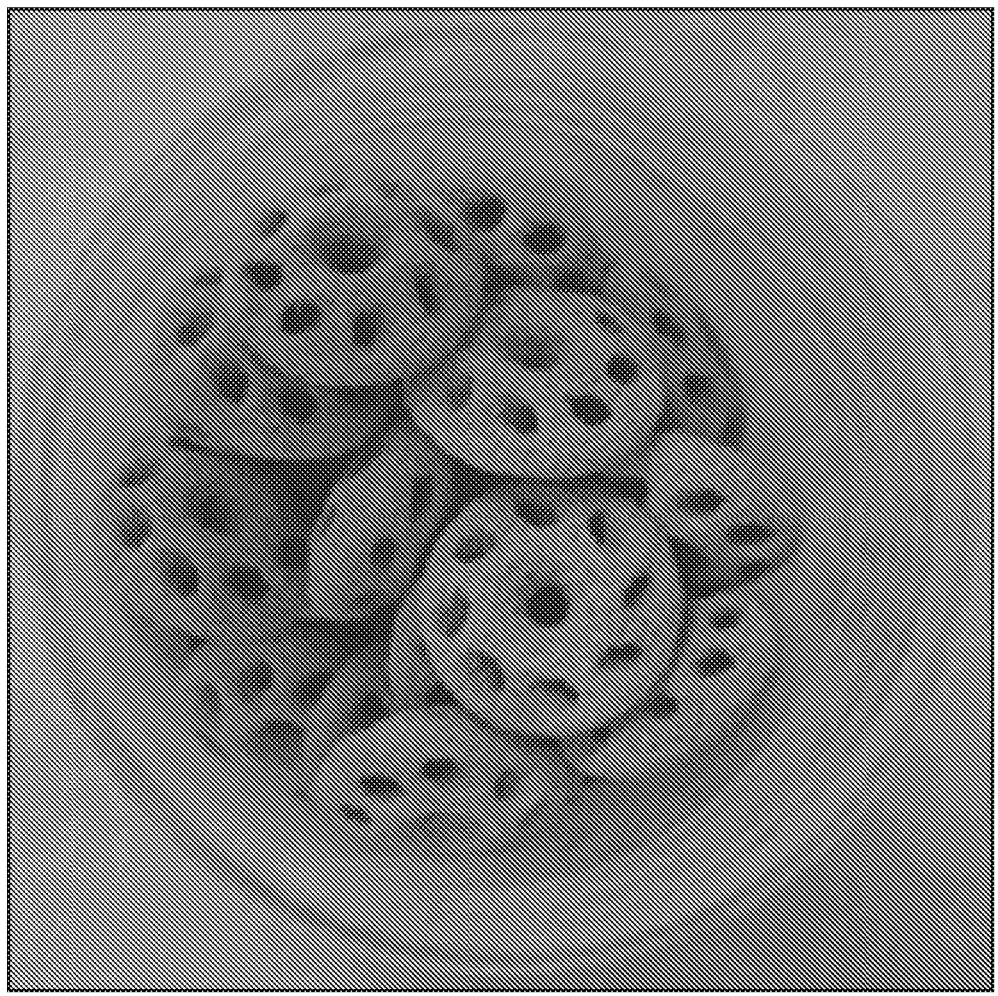
FIG. 10 is a photograph of the particles shown in FIG. 6.
Figure 11:
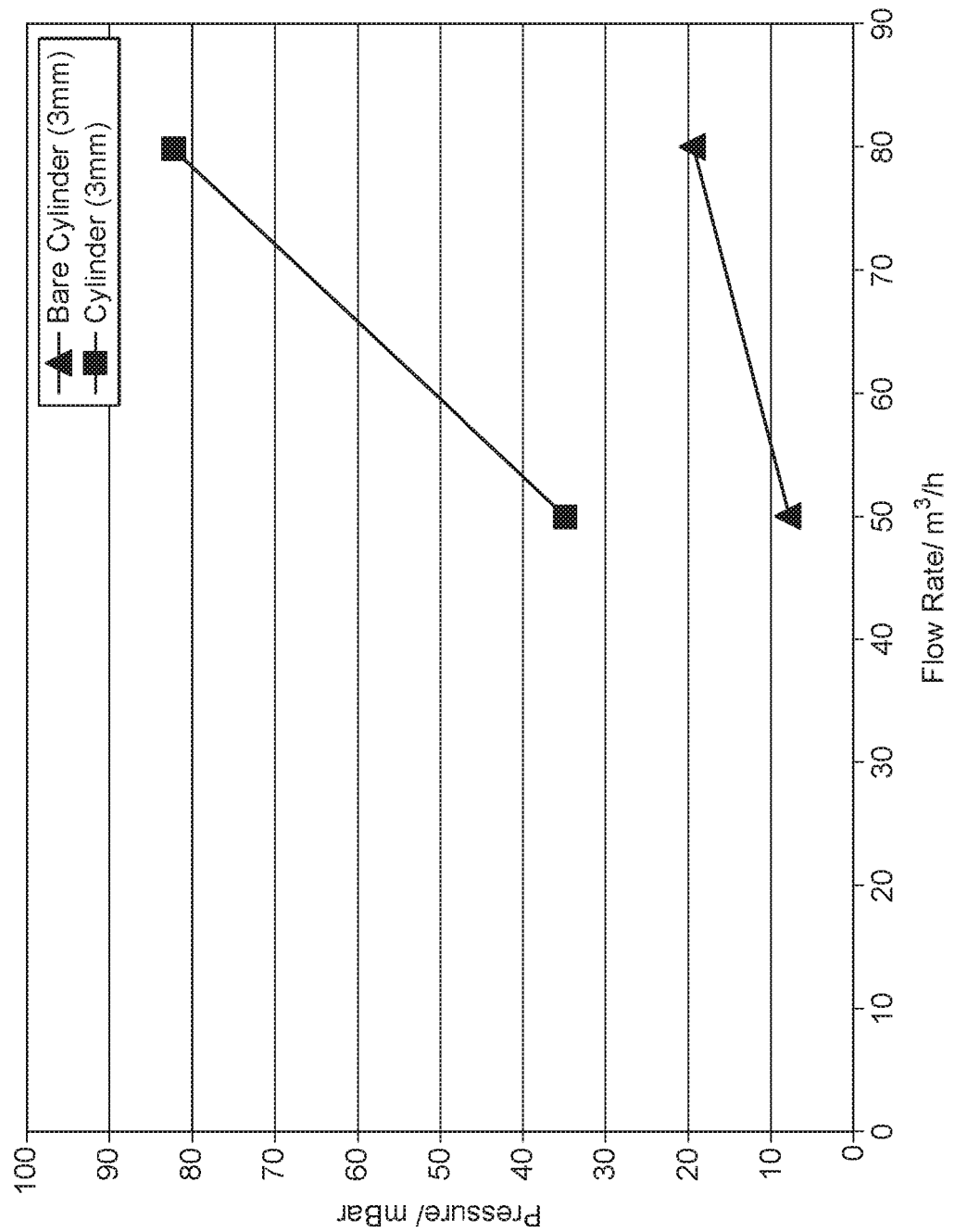
FIG. 11 is test data from Example 2.
Figure 12:
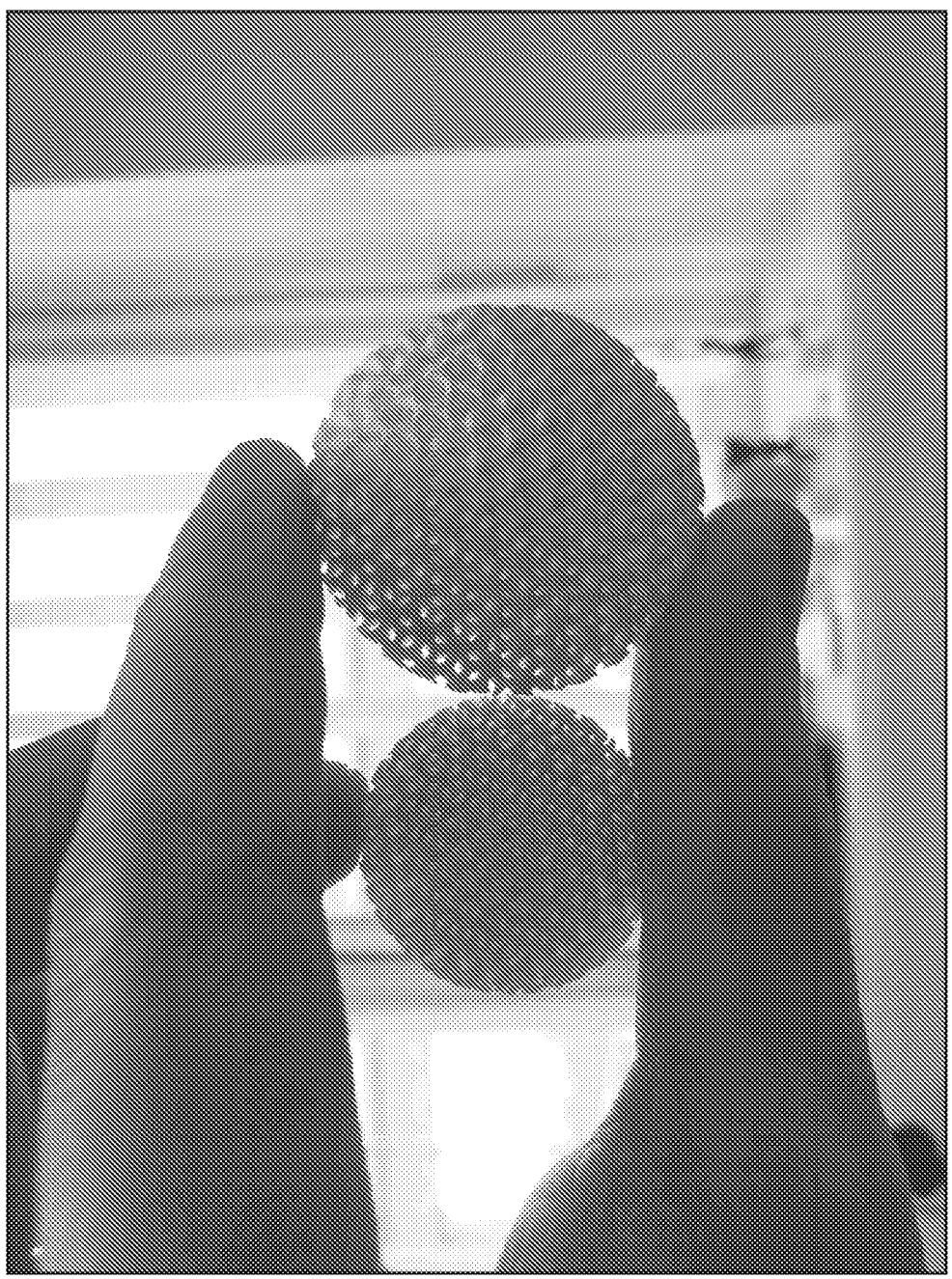
FIG. 12 is a photograph of an oblate spheroid having a complex internal structure formed by 3D printing the inverse of two, overlapping hexagonally packed spheres.

Example 2A catalyst comprising particles having the shape depicted in FIG. 6 was manufactured. The particles were formed from alumina and manufactured using an additive layer manufacturing method using a 3D printer. A metal cylinder with an inner diameter of 48 mm and a fine wire mesh with 3.3 mm apertures were manufactured. This was loaded with the catalyst particles and subjected to back pressure measurements. Pressure measurements were taken at flow rates of air at 50 $m^3/h$ and 80 $m^3/h$. The results comparing the bare (unloaded) cylinder to the particle loaded cylinder are shown in FIG. 11.

Example 3

A catalyst comprising particles having the shape depicted in FIG. 6 as well as a solid version to the same dimensions were manufactured. The particles were formed from alumina and manufactured using an additive layer manufacturing method using a 3D printer. The particles were separately subjected to heat transfer measurements. The rig consists of a 136 cm long brass tube with a diameter of 10 cm. Prior to the start of the run, low pressure steam is delivered to the steam jacket which surrounds a 60 cm section of the reactor tube, heating this section to a temperature of 100° C. Air is then passed through the rig at different flow-rates and at a constant pressure. The desired air flow-rate is controlled by the flow controller and is measured upstream by the flow-meter. A feedback loop between the flow controller and flow-meter enables precise flow-control to be achieved. The temperature of the air is measured before and after the steam jacket using Platinum Resistance Thermocouples (PRTs) and from these values a heat transfer co-efficient can be calculated at each flow-rate. PRTs are assumed to have an error of 0.1° C. The results are depicted in FIG. 13.

TABLE 1

| Particle FIG. | Major Diameter (mm) | Secondary Diameter (mm) | Third Diameter (mm) | Shell Thickness (mm) | Number of channels | Geometric Volume ($mm^3$) | Material Volume ($mm^3$) | Surface area ($mm^2$) | Pellets/$m^3$ (million) | SA/$m^3$ ($m^2$) | Relative Channel Size |
|---|---|---|---|---|---|---|---|---|---|---|---|
| 1 | 5 | 2.5 | 2.5 | — | 3 | 33 | 19 | 67 | 20.8 | 1390 | 1.2 |
| 2 | 8 | 5 | 5 | 1.3 | 12 | 168 | 105 | 315 | 4.1 | 1279 | 2.1 |
| 3 | 8 | 4 | 4 | 1.3 | 18 | 134 | 65 | 282 | 5.1 | 1429 | 2.0 |
| 4 | 12 | 6 | 6 | — | 12 | 452 | 316 | 556 | 1.5 | 830 | 3.0 |
| 5 | 12 | 6 | 6 | — | 7 | 452 | 292 | 511 | 1.5 | 773 | 3.0 |
| 6 | 9 | 4.7 | 4.7 | — | 9 | 199 | 66 | 348 | 3.4 | 1187 | 2.3 |
| 7 | 12 | 5 | 7 | — | 1 | 220 | 197 | 206 | 3.09 | 638 | 2.3 |
| 8 | 12 | 5 | 7 | — | 7 | 220 | 133 | 264 | 3.09 | 816 | 2.3 |
| 9 | 12 | 5 | 7 | — | 0 | 223 | 223 | 194 | 3.09 | 599 | 2.2 |

The invention claimed is:

1. A catalyst particle comprising a catalyst support in the form of a three-dimensional ellipsoidal shape having three major axes at least two of which axes are of different lengths including a principal axis having a length in a range of from 0.5 mm to 100 mm, the catalyst particle having an external surface and comprising two or more intra-particle channels, each intra-particle channel having an internal surface and comprising ribs, flutes, or vanes on its internal surface that optionally provide a threaded or helical channel, the channels extending from a first opening at a first location on the external surface of the particle through the interior of the particle to a second opening at a second location on the external surface of the particle, such that the first and second openings of the two or more intra-particle channels are distributed around the external surface of the catalyst particle in a regular pattern, and wherein the catalyst support is coated with at least one catalytically active composition.

2. The catalyst particle of claim 1, wherein all three of the major axes are of different lengths.

3. The catalyst particle of claim 1, wherein the catalyst support is a metal oxide or mixed metal oxide.

4. The catalyst particle of claim 3, wherein the catalyst support comprises an alumina, silica, a metal-aluminate, an alumino-silicate, zirconia, titania, magnesia, silicon nitride, silicon carbide, zinc oxide, carbon or a mixture thereof.

5. The catalyst particle of claim 1, comprising from 2 to 12 intra-particle channels, each intra-particle channel having an internal surface and extending from a first opening at a first location on the external surface of the particle through the interior of the particle to a second opening at a second location on the external surface of the particle, such that the first and second openings of the 2 to 24 intra-particle channels are distributed around the surface of the catalyst particle in a regular pattern.

6. The catalyst particle of claim 1, comprising from 1 to 100 intra-particle channels per $cm^2$ of the particle's cross-section.

7. The catalyst particle of claim 1, comprising a cavity that is in communication with two or more intra-particle channels extending from the external surface of the particle through the interior of the particle to said cavity.

8. The catalyst particle of claim 1, wherein the each of the two or more of intra-particle channels has a cross-section which varies along the length of the intra-particle channel.

9. The catalyst particle of claim 1, wherein each of the first and second openings of the two or more intra-particle channels has a chamfered edge.

10. The catalyst particle of claim 1, wherein the length of the principal axis is in a range of from 3 mm to 30 mm.

11. The catalyst particle of claim 1, comprising at least two different catalytically active compositions.

12. The catalyst particle of claim 1, wherein said catalytically active composition comprises at least one metal or metal compound is Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, or Ce or a compound thereof.

13. The catalyst particle of claim 1, wherein the at least one catalytically active composition is distributed on the external surface of the catalyst particle.

14. The catalyst particle of claim 1, wherein the at least one catalytically active composition is distributed on the internal surfaces of the two or more intra-particle channels of the catalyst particle.

15. A catalyst bed comprising a plurality of catalyst particles of claim 1 that are packed together within a vessel, the catalyst bed comprising void spaces between and within the catalyst particles, wherein the void spaces between particles form inter-particle channels through which a fluid may flow.

16. The catalyst bed of claim 15, wherein the volume of the void space within the catalyst particles equals the volume of void space between particles+/−50%.

17. The catalyst bed of claim 15, wherein the average minimum cross-sectional area of the intra-particle channels through the catalyst particles equals the average cross-sectional area of the inter-particle channels+/−50%.

18. A catalyst bed comprising a plurality of catalyst particles of claim 1.

19. The catalyst particle of claim 1, wherein each of the two or more intra-particle channels has a circular, elliptical, or polygonal cross-sectional shape, optionally providing a helical channel.

20. The catalyst particle of claim 1, wherein the ribs, flutes, or vanes on the internal surface of each of the two or more intra-particle channels provide threaded or helical channels.

21. The catalyst particle of claim 1, wherein each of the two or more intra-particle channels have (a) different cross-sectional dimensions, (b) different cross-sectional shapes, (c) differently chamfered first and second openings, or (d) a combination of (a), (b), or (c).

22. A method of performing a chemical reaction, the method comprising the step of contacting at least one starting chemical compound with a catalyst bed comprising a plurality of catalyst particles according to claim 15 to form at least one product chemical compound.

23. The method of claim 22, wherein said chemical reaction comprises hydrogenation, dehydrogenation, oxidation, hydrodesulphurisation, steam reforming, catalytic steam reforming, autothermal reforming, secondary reforming, reforming for direct reduction of iron, catalytic partial oxidation, water-gas shift, sour shift, low-temperature shift, intermediate temperature shift reaction, medium temperature shift reaction, high temperature shift reaction, methanation, a Fischer-Tropsch reaction, methanol synthesis, ammonia synthesis, ammonia oxidation, nitrous oxide decomposition, selective oxidation or reduction reaction of internal combustion engine or power station exhaust gas.

24. The method of claim 23, wherein the steam reforming is steam pre-reforming or the water-gas shift is an isothermal-shift reaction.

25. A method of treating a fluid mixture to selectively remove one or more target components of said mixture, the method comprising contacting said fluid with a packed bed comprising a catalyst bed of claim 15, wherein at least a portion of said one or more target components are transferred from said fluid mixture to said catalyst particles.

26. The method of claim 25, wherein said target components comprise a material that is sulphur, a compound of sulphur, a metal, a metal compound, or a carbonaceous particulate material.

27. The method of claim 22, wherein said starting chemical compound is a hydrocarbon, a nitrogen oxide, a substituted hydrocarbon, an alcohol, an amine, an ether, an aromatic hydrocarbon, or a substituted aromatic hydrocarbon.

* * * * *